US012594745B2

(12) United States Patent
Araujo Da Silva et al.

(10) Patent No.: US 12,594,745 B2
(45) Date of Patent: Apr. 7, 2026

(54) ELASTOMER LAMINATE

(71) Applicant: COMPAGNIE GENERALE DES ETABLISSEMENTS MICHELIN, Clermont-Ferrand (FR)

(72) Inventors: Jose-Carlos Araujo Da Silva, Clermont-Ferrand (FR); Thomas Ferrand, Clermont-Ferrand (FR); Emma Moreso, Clermont-Ferrand (FR); Maxime Pras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 189 days.

(21) Appl. No.: 18/281,070

(22) PCT Filed: Feb. 28, 2022

(86) PCT No.: PCT/FR2022/050351

§ 371 (c)(1),
(2) Date: Sep. 8, 2023

(87) PCT Pub. No.: WO2022/189724

PCT Pub. Date: Sep. 15, 2022

(65) Prior Publication Data

US 2024/0157684 A1 May 16, 2024

(30) Foreign Application Priority Data

Mar. 11, 2021 (FR) ....................................... 2102400

(51) Int. Cl.

| | |
|---|---|
| ***B32B 25/04*** | (2006.01) |
| ***B32B 25/16*** | (2006.01) |
| ***B32B 27/08*** | (2006.01) |
| ***B32B 27/20*** | (2006.01) |
| ***B32B 27/22*** | (2006.01) |
| ***B32B 27/26*** | (2006.01) |
| ***B32B 27/32*** | (2006.01) |
| ***B60C 1/00*** | (2006.01) |
| ***B60C 7/00*** | (2006.01) |

(52) U.S. Cl.

CPC ............ *B32B 25/042* (2013.01); *B32B 25/16* (2013.01); *B32B 27/08* (2013.01); *B32B 27/20* (2013.01); *B32B 27/22* (2013.01); *B32B 27/26* (2013.01); *B32B 27/32* (2013.01); *B60C 1/0016* (2013.01); *B60C 1/0025* (2013.01); *B60C 1/0041* (2013.01); *B60C 7/00* (2013.01); *B32B 2250/02* (2013.01); *B32B 2250/24* (2013.01); *B32B 2270/00* (2013.01); *B32B 2307/732* (2013.01); *B32B 2319/00* (2013.01); *B32B 2323/00* (2013.01); *B32B 2433/02* (2013.01); *B32B 2605/08* (2013.01)

(58) Field of Classification Search

CPC ....... B32B 25/042; B32B 25/16; B32B 27/08; B32B 27/20; B32B 27/22; B32B 27/26; B32B 27/32; B32B 2250/24; B32B 2270/00; B32B 2307/732; B32B 2319/00; B32B 2323/00; B32B 2433/02; B32B 2605/08; B60C 1/0016; B60C 1/0025; B60C 1/0041; B60C 7/00

See application file for complete search history.

(56) References Cited

U.S. PATENT DOCUMENTS

| | | | |
|---|---|---|---|
| 5,227,425 A | 7/1993 | Rauline | |
| 5,852,099 A | 12/1998 | Vanel | |
| 5,900,449 A | 5/1999 | Custodero et al. | |
| 6,420,488 B1 | 7/2002 | Penot | |
| 6,536,492 B2 | 3/2003 | Vasseur | |
| 7,250,463 B2 | 7/2007 | Durel et al. | |
| 7,335,692 B2 | 2/2008 | Vasseur et al. | |
| 8,268,949 B2 | 9/2012 | Thuilliez et al. | |
| 8,492,573 B2 | 7/2013 | Thuilliez et al. | |
| 10,752,712 B2 | 8/2020 | Lafaquiere et al. | |
| 10,934,377 B2 | 3/2021 | Lafaquiere et al. | |
| 11,241,370 B2 | 2/2022 | Valero et al. | |
| 11,731,401 B2 * | 8/2023 | Araujo Da Silva | .. B32B 25/042 428/493 |
| 2001/0034389 A1 | 10/2001 | Vasseur | |
| 2004/0127617 A1 | 7/2004 | Vasseur et al. | |
| 2005/0004297 A1 | 1/2005 | Durel et al. | |
| 2005/0032965 A1 | 2/2005 | Valero | |

(Continued)

FOREIGN PATENT DOCUMENTS

| | | |
|---|---|---|
| EP | 0501227 A1 | 9/1992 |
| EP | 0735088 A1 | 10/1996 |

(Continued)

OTHER PUBLICATIONS

R. Mildenburg, et al., Hydrocarbon Resins, "Rubber Tires and Mechanical Rubber Goods", VCH, New York, chapter 5.5, pp. 141-146 (1997).

(Continued)

*Primary Examiner* — Blaine Copenheaver
(74) *Attorney, Agent, or Firm* — VENABLE LLP

(57) ABSTRACT

An elastomer laminate comprises at least two adjacent layers, the first layer consisting of a composition based on 20 to 100 phr of at least one copolymer comprising ethylene units and units of a formula $CH_2{=}CR{-}CH{=}CH_2$, the ethylene units in the copolymer representing more than 50 mol % of the monomer units, R representing a hydrocarbon chain having 3 to 20 carbon atoms, 0 to 80 phr of at least one diene elastomer having a weight content of diene units of greater than 50%, 10 to 100 phr of a plasticizing system comprising at least one plasticizing resin having a glass transition temperature above 20° C. and/or at least one plasticizer that is liquid at 23° C., a reinforcing filler, and a crosslinking system, and the second layer consisting of a composition based on a diene elastomer having a weight content of diene units of greater than 50% and a crosslinking system.

15 Claims, No Drawings

(56) References Cited

U.S. PATENT DOCUMENTS

| | | | |
|---|---|---|---|
| 2009/0182104 A1 | 7/2009 | Thuilliez et al. | |
| 2010/0022725 A1 | 1/2010 | Thuilliez et al. | |
| 2017/0291454 A1 | 10/2017 | Araujo Da Silva et al. | |
| 2017/0326844 A1* | 11/2017 | Araujo Da Silva | B32B 7/12 |
| 2018/0355083 A1 | 12/2018 | Lafaquiere et al. | |
| 2019/0263954 A1 | 8/2019 | Lafaquiere et al. | |
| 2021/0009729 A1 | 1/2021 | Afaquiere et al. | |
| 2021/0054118 A1 | 2/2021 | Lafaquiere et al. | |
| 2022/0072903 A1 | 3/2022 | Merino Lopez et al. | |
| 2022/0073713 A1 | 3/2022 | Merino Lopez et al. | |
| 2022/0379586 A1 | 12/2022 | Araujo Da Silva et al. | |
| 2023/0022925 A1 | 1/2023 | Lemerle et al. | |
| 2023/0059504 A1 | 2/2023 | Araujo Da Silva et al. | |
| 2023/0391994 A1 | 12/2023 | Pibre et al. | |
| 2024/0026044 A1 | 1/2024 | Pibre et al. | |
| 2024/0174841 A1 | 5/2024 | Araujo Da Silva et al. | |
| 2025/0043118 A1 | 2/2025 | Araujo Da Silva et al. | |
| 2025/0179233 A1* | 6/2025 | Layman | C08F 4/48 |

FOREIGN PATENT DOCUMENTS

| | | | | |
|---|---|---|---|---|
| EP | 0810258 A1 | 12/1997 | | |
| FR | 3003506 A1 | 9/2014 | | |
| FR | 3029138 A1 | 6/2016 | | |
| FR | 3078973 A1 | 9/2019 | | |
| FR | 3089976 A1 | 6/2020 | | |
| WO | 97/36724 A2 | 10/1997 | | |
| WO | 99/16600 A1 | 4/1999 | | |
| WO | 00/05300 A1 | 2/2000 | | |
| WO | 00/05301 A1 | 2/2000 | | |
| WO | 02/088238 A1 | 11/2002 | | |
| WO | 03/016215 A1 | 2/2003 | | |
| WO | 03/016387 A1 | 2/2003 | | |
| WO | 2007/054223 A2 | 5/2007 | | |
| WO | 2007/054224 A2 | 5/2007 | | |
| WO | 2017/093654 A1 | 6/2017 | | |
| WO | 2018/020122 A1 | 2/2018 | | |
| WO | WO2020/128249 A1 * | 6/2020 | | B60C 1/00 |

OTHER PUBLICATIONS

S. Georges, et al., "Polymyrcene microstructure revisited from precis high-field nuclear magnetic resonance analysis", Polymer 55 (2014) 3869-3878.

Copending U.S. Appl. No. 18/866,397, filed May 16, 2023.

Copending U.S. Appl. No. 18/866,379, filed May 16, 2023.

Copending U.S. Appl. No. 18/874,760, filed Jun. 19, 2023.

Copending U.S. Appl. No. 18/874,768, filed Jun. 19, 2023.

International Search Report dated Jun. 9, 2022, in corresponding PCT/FR2022/050351 (4 pages).

* cited by examiner

ELASTOMER LAMINATE

BACKGROUND

The field of the present invention is that of rubber laminates comprising a highly saturated diene elastomer, in particular those intended for use in a tyre.

A tyre usually comprises two beads intended to come into contact with a rim, a crown composed of at least one crown reinforcement and a tread, and two sidewalls, the tyre being reinforced by a carcass reinforcement anchored in the two beads.

In the conventional manufacture of a tyre, the various constituent components of the crown, of the carcass reinforcement, of the beads and of the sidewalls are assembled to form a pneumatic tyre. The assembly step is followed by a step of forming the tyre so as to give the assembly the toric shape before the in-press curing step.

When the tyre is assembled, the tread is positioned radially outside the crown reinforcement, and is generally separated from the latter by a tread underlayer. The sidewalls, for their part, are elastomer layers positioned outside the carcass reinforcement relative to the internal cavity of the tyre, between the crown and the beads, so as to totally or partially cover the region of the carcass reinforcement extending from the crown to the beads.

The tread, which is intended to come into contact with the ground when the tyre is rolling, must have very specific properties which are in particular good grip both on dry and on wet ground, low rolling resistance and good wear resistance. The sidewall of the tyre is itself subjected to cycles of deformation such as bending when the tyre is rolling; the rubber composition constituting a tyre sidewall must be both sufficiently flexible and not very hysteretic, but also must have good resistance to physical attacks, such as pavement impacts, and chemical attacks such as ozone attack. As a result, the compositions of tyre treads and sidewalls consist of a very specific composition, different from the tyre layers on which they are placed, such as, respectively, the underlayer of the tread, or the carcass ply, which often consist of a composition comprising a highly unsaturated diene elastomer, such as natural rubber, and of a reinforcing filler, such as carbon black.

This difference in composition can lead to a reduction in the properties of adhesion of the tread or the sidewall of a tyre with their respective adjacent layer.

Consequently, it remains important to develop compositions which have good properties with respect to the position (tread or sidewall for example) for which they are intended, while at the same time having good adhesion to their respective adjacent layer, in particular to improve the hold of the cured interfaces.

Continuing its research, the applicant has discovered that the use of a copolymer comprising ethylene units and units of a specific 1,3-diene makes it possible to further improve the adhesion of the composition to a diene composition.

SUMMARY

Thus, a first subject of the invention is an elastomer laminate comprising at least two adjacent layers:

- the first layer consisting of a rubber composition based on:
  - 20 to 100 phr of at least one copolymer comprising ethylene units and units of a 1,3-diene of formula (I), the ethylene units in the copolymer representing more than 50 mol % of the monomer units of the copolymer, $$CH_2{=}CR{-}CH{=}CH_2 \quad (I)$$

the symbol R representing a hydrocarbon chain having 3 to 20 carbon atoms;

- 0 to 80 phr of at least one diene elastomer having a weight content of diene units of greater than 50%;
  - 10 to 100 phr of a plasticizing system comprising at least one plasticizer that is liquid at 23° C. and/or at least one plasticizing resin having a glass transition temperature above 20° C.;
  - a reinforcing filler; and
  - a crosslinking system,
- the second layer consisting of a rubber composition based on a diene elastomer having a weight content of diene units of greater than 50% and a crosslinking system.

Another subject of the invention is a rubber article, and also a pneumatic or non-pneumatic tyre, comprising this laminate.

I— DEFINITIONS

The expression "based on" used to define the constituents of a catalytic system is understood to mean the mixture of these constituents, or the product of the reaction of a portion or all of these constituents with one another.

The expression "composition based on" should be understood as meaning a composition including the mixture and/or the product of the in situ reaction of the various constituents used, some of these constituents being able to react and/or being intended to react with each other, at least partially, during the various phases of manufacture of the composition; the composition thus possibly being in the totally or partially crosslinked state or in the non-crosslinked state.

An "elastomer matrix" is understood to mean all of the elastomers of the composition, including the copolymer defined below.

Unless otherwise indicated, the contents of the units resulting from the insertion of a monomer into a copolymer are expressed as molar percentage with respect to all of the monomer units of the copolymer.

The expression "part by weight per hundred parts by weight of elastomer" (or phr) should be understood as meaning, within the context of the present invention, the part by weight per hundred parts of elastomer present in the rubber composition in question and constituting a layer.

Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b). In the present document, when an interval of values is denoted by the expression "from a to b", the interval represented by the expression "between a and b" is also, and preferentially, denoted.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight relative to the total weight of the elastomers in the composition. In the same way, a "predominant" filler is the one representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. By contrast, a "minor" compound is a compound which does not represent the greatest weight fraction among the compounds of the same type. Preferably, the term "predominant" is intended to mean present at more than 50% by weight, preferably more than 60%, 70%, 80%, 90%, and more preferentially the "predominant" compound represents 100% by weight.

The compounds mentioned in the description may be of fossil origin or may be biobased. In the latter case, they may be partially or completely derived from biomass or be obtained from renewable raw materials derived from biomass. Similarly, the compounds mentioned may also be derived from the recycling of already-used materials, i.e. they may be partly or completely derived from a recycling process, or else obtained from raw materials which are themselves derived from a recycling process.

All the values for glass transition temperature "Tg" described in the present document are measured in a known manner by DSC (Differential Scanning Calorimetry) according to the standard ASTM D3418 (1999).

II— DESCRIPTION OF THE INVENTION

II-1 Laminate

According to the invention, the laminate comprises at least two, preferably strictly two, adjacent layers, called "first layer" and "second layer".

The term "adjacent layers" is intended to mean that the layers are in contact, at least in part, with one another.

The first layer of the laminate according to the invention may have a thickness within a range extending from 0.2 to 120 mm, preferably from 0.3 to 15 mm.

Advantageously, the first layer of the laminate according to the invention has a thickness within a range extending from 0.5 to 120 mm, preferably from 1 to 15 mm. These dimensions are particularly advantageous when the first layer constitutes an outer layer of the tyre, such as a tyre sidewall or a tyre tread.

The first layer of the laminate according to the invention may also have a thickness within a range extending from 0.2 to 10 mm, preferably from 0.3 to 5 mm. These dimensions are particularly advantageous when the first layer constitutes a bonding layer between two tyre layers.

Regardless of the thickness of the first layer, the second layer preferably has a thickness within a range extending from 0.2 to 10 mm, preferably from 0.3 to 7 mm.

The first and the second layer of the laminate can totally or partially overlap.

II-2 Composition of the First Layer of the Laminate

II-2.1 Elastomer Matrix

According to the invention, the first layer consists of a rubber composition based on:

- 20 to 100 phr of at least one copolymer comprising ethylene units and units of a 1,3-diene of formula (I), the ethylene units in the copolymer representing more than 50 mol % of the monomer units of the copolymer, $$CH_2{=}CR{-}CH{=}CH_2 \qquad (I)$$

the symbol R representing a hydrocarbon chain having 3 to 20 carbon atoms;

- 0 to 80 phr of at least one diene elastomer having a weight content of diene units of greater than 50%;
- 10 to 100 phr of a plasticizing system comprising at least one plasticizer that is liquid at 23° C. and/or at least one plasticizing resin having a glass transition temperature above 20° C.;
- a reinforcing filler; and
- a crosslinking system.

In the present document, unless otherwise indicated, the expression "the copolymer" denotes "the at least one copolymer comprising ethylene units and units of a 1,3-diene of formula (I), the ethylene units in the copolymer representing more than 50 mol % of the monomer units of the copolymer, $CH_2{=}CR{-}CH{=}CH_2$ (I), the symbol R representing a hydrocarbon chain having 3 to 20 carbon atoms" for the sake of simplicity of wording.

Preferably, the copolymer contains ethylene units which represent between 50 mol % and 95 mol % of the monomer units of the copolymer, that is to say between 50 mol % and 95 mol % of the ethylene units and of the units of the 1,3-diene. Very preferentially, the copolymer contains ethylene units which represent from 60 mol % to 90 mol %, preferably from 70 mol % to 85 mol %, of the monomer units of the copolymer.

The 1,3-diene of formula (I) is a substituted 1,3 diene, which can give rise to units of 1,2 configuration represented by formula (1), of 3,4 configuration represented by formula (2) and of 1,4 configuration, the trans form of which is represented below by formula (3).

(1)

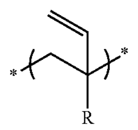

(2)

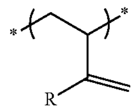

(3)

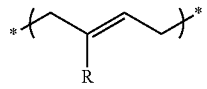

As is also well known, the ethylene unit is a unit of $-(CH_2-CH_2)-$ moiety.

The copolymer which is useful for the purposes of the invention is a copolymer comprising ethylene units and units of the 1,3-diene of formula (I), which implies that monomer units of the copolymer are units resulting from the polymerization of ethylene and of the 1,3-diene of formula (I). The copolymer thus comprises ethylene units and units of the 1,3-diene of formula (I). According to the invention, the 1,3-diene may be just one compound, that is to say just one 1,3-diene of formula (I), or be a mixture of 1,3-dienes of formula (I), the 1,3-dienes of the mixture differing from one another by the group represented by the symbol R.

The copolymer which is useful for the purposes of the invention is advantageously a random copolymer according to any one of the embodiments of the invention.

In formula (I) of the 1,3-diene, the hydrocarbon chain represented by the symbol R is an unsaturated chain of from 3 to 20 carbon atoms. Preferably, the symbol R represents a hydrocarbon chain having from 6 to 16 carbon atoms.

The hydrocarbon chain represented by the symbol R may be a saturated or unsaturated chain. Preferably, the symbol R represents an aliphatic chain, in which case in formula (I) of the 1,3-diene, the hydrocarbon chain represented by the symbol R is an aliphatic hydrocarbon chain. It can be a linear or branched chain, in which case the symbol R represents a linear or branched chain. Preferably, the hydrocarbon chain is acyclic, in which case the symbol R represents an acyclic chain. More preferably, the symbol R represents an unsaturated and branched acyclic hydrocarbon chain. Thus, the hydrocarbon chain represented by the symbol R is advantageously an unsaturated and branched acyclic chain containing from 3 to 20 carbon atoms, in particular from 6 to 16 carbon atoms. Very advantageously, the 1,3-diene is myrcene, β-farnesene or a mixture of myrcene and β-farnesene.

Advantageously, the copolymer contains units of the 1,3-diene of formula (I) which represent between 1 mol % and 50 mol %, preferably between 1 mol % and 30 mol %, preferably between 5 mol % and 30 mol %, of the monomer units of the copolymer.

The copolymer may comprise a second 1,3-diene chosen from 1,3-butadiene, isoprene or a mixture thereof. In this case, the copolymer is a copolymer of ethylene, of a 1,3-diene of formula (I) and of a second 1,3-diene chosen from 1,3-butadiene, isoprene or a mixture thereof, the monomer units of the copolymer are units resulting from the polymerization of ethylene, of the 1,3-diene of formula (I) and of the second 1,3-diene. The copolymer they thus comprise ethylene units, units of the 1,3-diene of formula (I) and units of the second 1,3-diene. Advantageously, the second 1,3-diene of the copolymer is 1,3-butadiene.

Advantageously, the copolymer contains units of the second 1,3-diene which represent between 1 mol % and 49 mol %, preferably between 4 mol % and 29 mol %, preferably between 4 mol % and 25 mol %, of the monomer units of the copolymer.

Preferably, the copolymer has a glass transition temperature below −35° C., preferably between −90° C. and −35° C., more preferably between −70° C. and −35° C.

The copolymer may be prepared by a process which comprises the copolymerization of ethylene, of the 1,3-diene of formula (I) and of the optional second 1,3-diene, in the presence of a catalytic system based at least on a metallocene of formula (II) and on an organomagnesium compound of formula (III)

$$P(Cp^1Cp^2)\ Nd(BH_4)_{(1+y)}{\cdot}L_y{\text -}N_x \qquad (II)$$

$$MgR^1R^2 \qquad (III)$$

in which.

- $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups,
- P being a group bridging the two $Cp^1$ and $Cp^2$ groups and representing a $ZR^3R^4$ group, Z representing a silicon or carbon atom, $R^3$ and $R^4$, which may be identical or different, each representing an alkyl group comprising from 1 to 20 carbon atoms, preferably a methyl,
- y, which is an integer, being equal to or greater than 0,
- x, which is or is not an integer, being equal to or greater than 0,
- L representing an alkali metal selected from the group consisting of lithium, sodium and potassium,
- N representing a molecule of an ether, preferably diethyl ether or tetrahydrofuran,
- $R^1$ and $R^2$, which may be identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as represented in the diagram below, the 9 position corresponding to the carbon atom to which the bridge P is attached.

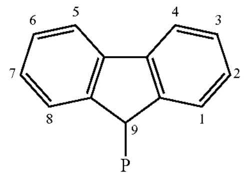

The catalytic system can be prepared conventionally by a process analogous to that described in patent application WO 2007054224 or WO 2007054223. For example, the organomagnesium compound and the metallocene are reacted in a hydrocarbon-based solvent typically at a temperature ranging from 20° C. to 80° C. for a period of time of between 5 and 60 minutes. The catalytic system is generally prepared in an aliphatic hydrocarbon-based solvent such as methylcyclohexane, or an aromatic hydrocarbon-based solvent such as toluene. Generally, after its synthesis, the catalytic system is used in this form in the process for the synthesis of the copolymer in accordance with the invention.

Alternatively, the catalytic system may be prepared via a process analogous to that described in patent application WO 2017/093654 A1 or in patent application WO 2018/020122 A1. According to this alternative, the catalytic system further contains a preformation monomer selected from a conjugated diene, ethylene or a mixture of ethylene and a conjugated diene, in which case the catalytic system is based at least on the metallocene, the organomagnesium compound and the preformation monomer. For example, the organomagnesium compound and the metallocene are reacted in a hydrocarbon-based solvent typically at a temperature of from 20° C. to 80° C. for 10 to 20 minutes to obtain a first reaction product, and the preformation monomer, chosen from a conjugated diene, ethylene or a mixture of ethylene and a conjugated diene, is then reacted with this first reaction product at a temperature ranging from 40° C. to 90° C. for 1 hour to 12 hours. The conjugated diene, as preformation monomer, is preferably a 1,3-diene such as 1,3-butadiene, isoprene or else a 1,3-diene of formula (I), in particular myrcene or 0-farnesene. The catalytic system thus obtained can be used immediately in the process in accordance with the invention or be stored under an inert atmosphere before it is used in the process in accordance with the invention.

The metallocene used for preparing the catalytic system can be in the form of a crystalline or non-crystalline powder, or else in the form of single crystals. The metallocene may be in a monomer or dimer form, these forms depending on the method of preparation of the metallocene, as is described, for example, in patent application WO 2007/054224 or WO 2007/054223. The metallocene can be prepared conventionally by a process analogous to that described in patent application WO 2007054224 or WO 2007054223, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

Like any synthesis performed in the presence of an organometallic compound, the synthesis of the metallocene and that of the catalytic system take place under anhydrous conditions under an inert atmosphere. Typically, the reactions are performed starting with anhydrous solvents and compounds under anhydrous nitrogen or argon.

The organomagnesium compound useful for the purposes of the invention is of formula $MgR^1R^2$, in which $R^1$ and $R^2$, which may be identical or different, represent a carbon group. Carbon group is understood to mean a group which contains one or more carbon atoms. Preferably, $R^1$ and $R^2$ contain from 2 to 10 carbon atoms. More preferentially, $R^1$ and $R^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferentially is greater than or equal to 1 and less than 10. The range of values extending from 1 to less than 10 is in particular more favourable for obtaining copolymers of high molar masses.

When the copolymer useful for the purposes of the invention is a copolymer which has a microstructure as defined according to the first variant of the invention, it is prepared according to the process mentioned in the present application using a metallocene of formula (II) in which $Cp^1$ and $Cp^2$, which may be identical or different, are selected from the group consisting of substituted fluorenyl groups and the unsubstituted fluorenyl group of formula $C_{13}H_8$. For this variant, the metallocenes of the following formulae, in which the symbol Flu presents the fluorenyl group of formula $C_{13}Hg$, are particularly suitable: $[\{Me_2SiFlu_2Nd(\mu\text{-}BH_4)_2Li(THF)\}_2]$; $[Me_2SiFlu_2Nd(\mu\text{-}BH_4)_2Li(THF)]$; $[Me_2SiFlu_2Nd(\mu\text{-}BH_4)(THF)]$; $[\{Me_2SiFlu_2Nd(\mu\text{-}BH_4)(THF)\}_2]$; $[Me_2SiFlu_2Nd(\mu\text{-}BH_4)]$.

Those skilled in the art also know how to adjust the polymerization conditions and the concentrations of each of the reactants (constituents of the catalytic system, monomers) according to the equipment (devices, reactors) used to carry out the polymerization and the various chemical reactions. As is known to those skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon-based solvents.

The polymerization is preferably performed in solution, continuously or batchwise. The polymerization solvent may be an aromatic or aliphatic hydrocarbon-based solvent. Examples of polymerization solvents that may be mentioned include toluene and methylcyclohexane. The monomers may be introduced into the reactor containing the polymerization solvent and the catalytic system or, conversely, the catalytic system may be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30° C. to 150° C., preferentially from 30° C. to 120° C. Preferably, the copolymerization is carried out at constant ethylene pressure.

During the polymerization of ethylene, the 1,3-diene of formula (I) and the optional second 1,3-diene, in a polymerization reactor, ethylene and the the 1,3-diene of formula (I) and the optional second 1,3-diene may be added continuously to the polymerization reactor, in which case the polymerization reactor is a fed reactor. This embodiment is most particularly suitable for the synthesis of a random copolymer.

The polymerization can be halted by cooling the polymerization medium. The polymer can be recovered according to conventional techniques known to those skilled in the art, for instance by precipitation, by evaporation of the solvent under reduced pressure or by steam stripping.

The elastomer matrix of the composition of the first layer of the laminate according to the invention may predominantly comprise the copolymer comprising ethylene units and units of a 1,3-diene of formula (I). In this case, the content of the copolymer comprising ethylene units and units of a 1,3-diene of formula (I) in the composition of the first layer is advantageously within a range extending from more than 50 to 100 phr, preferably from 75 to 100 phr, more preferably from 90 to 100 phr. The content of the copolymer comprising ethylene units and units of a 1,3-diene of formula (I) in the composition of the first layer may advantageously be 100 phr, that is to say that the elastomer matrix of the composition of the first layer of the laminate does not comprise any elastomer other than the copolymer comprising ethylene units and units of a 1,3-diene of formula (I). It is understood that the copolymer may consist of a mixture of copolymers which differ from one another in their microstructure or their macrostructure. When the elastomer matrix of the composition of the first layer predominantly comprises the copolymer comprising ethylene units and units of a 1,3-diene of formula (I), the content of the diene elastomer having a weight content of diene units of greater than 50% in the composition of the first layer of the laminate according to the invention may be within a range extending from 0 to less than 50 phr, preferably from 0 to 25 phr, more preferably from 0 to 10 phr.

The elastomer matrix of the composition of the first layer of the laminate according to the invention advantageously comprises a mixture of the copolymer comprising ethylene units and units of a 1,3-diene of formula (I) and of at least one diene elastomer having a weight content of diene units of greater than 50%. Advantageously, the composition of the first layer of the laminate according to the invention comprises from 20 to 90 phr, preferably from 25 to 80 phr, more preferably from 30 to 80 phr, of the copolymer comprising ethylene units and units of a 1,3-diene of formula (I). It is understood that the copolymer may consist of a mixture of copolymers which differ from one another in their microstructure or their macrostructure. In this case, the content of the diene elastomer having a weight content of diene units of greater than 50% in the composition of the first layer of the laminate according to the invention is advantageously within a range extending from 10 to 80 phr, preferably from 20 to 75 phr, more preferably from 20 to 70 phr.

A diene unit is intended to mean a monomer unit originating from the insertion of a monomer moiety resulting from the polymerization of a conjugated diene monomer or of a non-conjugated diene monomer, the diene unit comprising a carbon-carbon double bond.

Advantageously, the diene elastomer having a weight content of diene units of greater than 50% of the composition of the first layer is selected from the group consisting of polybutadienes (BRs), natural rubber (NR), synthetic polyisoprenes (IRs), butadiene copolymers, isoprene copolymers and the mixtures of these elastomers.

Preferably, the diene elastomer having a weight content of diene units of greater than 50% of the composition of the first layer is selected from the group consisting of isoprene elastomers.

"Isoprene elastomer" is understood to mean, as is known, an isoprene homopolymer or copolymer, in other words a diene elastomer selected from the group consisting of natural rubber (NR), synthetic polyisoprenes (IRs), the various isoprene copolymers and the mixtures of these elastomers.

Advantageously, the isoprene elastomer is a polyisoprene comprising a weight content of cis-1,4 bonds of at least 90%, preferably at least 98%, of the weight of the polyisoprene.

Preferably, the polyisoprene is selected from the group consisting of natural rubber, synthetic polyisoprenes, and mixtures thereof. More preferably, the polyisoprene is a natural rubber.

II-2.2 Plasticizing System

The rubber composition of the first layer of the laminate according to the invention further comprises 10 to 100 phr of a plasticizing system comprising at least one plasticizer that is liquid at 23° C., referred to as "low-Tg", that is to say which by definition has a Tg below −20° C., preferably below −40° C. and/or a plasticizing resin having a glass transition temperature above 20° C., referred to as "high Tg", (also denoted "plasticizing resin" in the present document for the sake of simplicity of wording).

Advantageously, the content of the plasticizing system comprising at least one plasticizer that is liquid at 23° C. and/or at least one plasticizing resin having a glass transition temperature above 20° C., in the composition of the first layer of the laminate according to the invention, is within a range extending from 35 to 100 phr, preferably from 50 to 95 phr, more preferably from 55 to 90 phr.

Advantageously, the plasticizing system of the composition of the first layer of the laminate according to the invention comprises at least one plasticizing resin having a glass transition temperature above 20° C., preferably it comprises both a plasticizer that is liquid at 23° C. and a plasticizing resin having a glass transition temperature above 20° C.

II-2.2.a Plasticizing Resin

The designation "resin" is reserved, in the present patent application, by definition known to those skilled in the art, for a compound which is solid at ambient temperature (23° C.), in contrast to a liquid plasticizing compound, such as an oil.

Plasticizing resins are polymers well known to those skilled in the art, essentially based on carbon and hydrogen but which can comprise other types of atoms, which can be used in particular as plasticizing agents or tackifying agents in polymer matrices. They are generally by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, notably in the tyre rubber field (5.5. *"Rubber Tires and Mechanical Goods"*). They may be aliphatic, cycloaliphatic, aromatic, hydrogenated aromatic, or of the aliphatic/aromatic type, that is to say based on aliphatic and/or aromatic monomers. They can be natural or synthetic and may or may not be petroleum-based (if such is the case, they are also known under the name of petroleum resins). Their Tg is preferably above 20° C. (generally between 30° C. and 95° C.).

As is known, these plasticizing resins can also be described as thermoplastic resins in the sense that they soften when heated and can thus be moulded. They can also be defined by a softening point. The softening point of a plasticizing resin is generally approximately 50° C. to 60° C. higher than its Tg value. The softening point is measured according to Standard ISO 4625 (ring and ball method). The macrostructure (Mw, Mn and PDI) is determined by size exclusion chromatography (SEC) as indicated below.

As a reminder, SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/litre. The solution is then filtered through a filter with a porosity of 0.45 μm, before injection into the apparatus. The apparatus used is, for example, a Waters Alliance chromatographic line according to the following conditions:

- elution solvent is tetrahydrofuran;
- temperature: 35° C.;
- concentration: 1 g/litre;
- flow rate: 1 ml/min;
- injected volume: 100 μl;
- Moore calibration with polystyrene standards;
- set of 3 "Waters" columns in series (Styragel HR4E, Styragel HR1 and Styragel HR 0.5);
- detection by differential refractometer (for example WATERS 2410) which may be equipped with operating software (for example Waters Millenium).

A Moore calibration is carried out with a series of commercial polystyrene standards having a low PDI (less than 1.2), with known molar masses, covering the range of masses to be analysed. The weight-average molar mass (Mw), the number-average molar mass (Mn) and also the polydispersity index (PDI=Mw/Mn) are deduced from the data recorded (curve of weight distribution of the molar masses).

All the molar mass values indicated in the present patent application are thus relative to calibration curves produced with polystyrene standards.

According to a preferential embodiment of the invention, the plasticizing resin exhibits at least any one, preferably 2 or 3, more preferentially all, of the following characteristics:

- a Tg above 25° C. (in particular between 30° C. and 100° C.), more preferentially above 30° C. (in particular between 30° C. and 95° C.);
- a softening point above 50° C. (in particular between 50° C. and 150° C.);

a number-average molar mass (Mn) of between 300 and 2000 g/mol, preferentially between 400 and 1500 g/mol;

a polydispersity index (PDI) of less than 3, preferentially less than 2 (as a reminder: PDI=Mw/Mn with Mw the weight-average molar mass).

The preferential high Tg plasticizing resins above are well known to those skilled in the art and are commercially available, for example sold as regards:

polylimonene resins: by DRT under the name Dercolyte L120 (Mn=625 g/mol; Mw=1010 g/mol; PDI=1.6; Tg=72° C.) or by Arizona under the name Sylvagum TR7125C (Mn=630 g/mol; Mw=950 g/mol; PDI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and Escorez 1273;

limonene/styrene copolymer resins: by DRT under the name Dercolyte TS 105 from DRT or by Arizona Chemical Company under the names ZT115LT and ZT5100.

According to the invention, the plasticizing resin having a glass transition temperature above 20° C. can be selected from the group comprising or consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and mixtures thereof. Preferably, the plasticizing resin is selected from the group comprising or consisting of (D)CPD/vinylaromatic copolymer resins, (D)CPD/terpene copolymer resins, terpene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins and mixtures thereof.

The term "terpene" groups together here, in a known manner, α-pinene, β-pinene and limonene monomers; use is preferentially made of a limonene monomer, a compound which exists, in a known manner, in the form of three possible isomers: L-limonene (laevorotatory enantiomer), D-limonene (dextrorotatory enantiomer) or dipentene, the racemate of the dextrorotatory and laevorotatory enantiomers. Suitable as vinylaromatic monomers are, for example: styrene, α-methylstyrene, ortho-methylstyrene, meta-methylstyrene, para-methylstyrene, vinyltoluene, para-(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the plasticizing resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

All the above plasticizing resins are well known to those skilled in the art and are commercially available, for example sold by DRT under the name Dercolyte as regards polylimonene resins, sold by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or else by Struktol under the name 40 MS or 40 NS (mixtures of aromatic and/or aliphatic resins).

Advantageously, the content of plasticizing resin having a glass transition temperature above 20° C. in the composition of the first layer of the laminate according to the invention is within a range extending from 1 to 99 phr, preferably from 5 to 95 phr, preferably from 10 to 90 phr, preferably from 15 to 85 phr. Those skilled in the art clearly understand that when the content of the plasticizing resin having a glass transition temperature above 20° C. is lower than the minimum content of the plasticizing system comprising at least one plasticizer that is liquid at 23° C. and/or at least one plasticizing resin having a glass transition temperature above 20° C., the composition comprises at least the balance of the plasticizer that is liquid at 23° C. When the composition of the first layer of the laminate according to the invention comprises no plasticizer that is liquid at 23° C., the content of the resin having a glass transition temperature above 20° C. in the composition is advantageously within a range extending from 10 to 90 phr, preferably from 15 to 85 phr, preferably from 20 to 80 phr.

II-2.2.b Plasticizer that is Liquid at 23° C.

Any plasticizer that is liquid at 23° C. (or extender oil), whether of an aromatic or non-aromatic nature, known for its plasticizing properties with regard to diene elastomers, can be used. At ambient temperature (23° C.), these plasticizers or these oils, which are more or less viscous, are liquids (that is to say, as a reminder, substances which have the ability to eventually take on the shape of their container), as opposed, in particular, to plasticizing resins, which are by nature solids at ambient temperature.

Plasticizers liquid at 23° C. selected from the group comprising or consisting of liquid diene polymers, polyolefin oils, naphthenic oils, paraffinic oils, DAE oils, MES (Medium Extracted Solvates) oils, TDAE (Treated Distillate Aromatic Extracts) oils, RAE (Residual Aromatic Extracts) oils, TRAE (Treated Residual Aromatic Extracts) oils, SRAE (Safety ResidualAromatic Extracts) oils, mineral oils, vegetable oils, ether plasticizers, ester plasticizers, phosphate plasticizers, sulfonate plasticizers and the mixtures of these plasticizers liquid at 23° C. are particularly suitable.

For example, the plasticizer that is liquid at 23° C. can be a petroleum oil, which is preferably non-aromatic. A liquid plasticizer is described as non-aromatic when it has a content of polycyclic aromatic compounds, determined with the extract in DMSO according to the IP 346 method, of less than 3% by weight, relative to the total weight of the plasticizer.

The plasticizer that is liquid at 23° C. can also be a liquid polymer resulting from the polymerization of olefins or of dienes, such as polybutenes, polydienes, in particular polybutadienes, polyisoprenes (also known under the name LIRs) or copolymers of butadiene and of isoprene, or else copolymers of butadiene or of isoprene and of styrene, or the mixtures of these liquid polymers. The number-average molar mass of such liquid polymers is preferably within a range extending from 500 g/mol to 50 000 g/mol, preferably from 1000 g/mol to 10 000 g/mol. Mention may be made, by way of example, of the Ricon products from Sartomer.

When the plasticizer that is liquid at 23° C. is a vegetable oil, it can, for example, be an oil selected from the group comprising or consisting of linseed oil, safflower oil, soybean oil, maize oil, cottonseed oil, turnip rapeseed oil, castor oil, tung oil, pine oil, sunflower oil, palm oil, olive oil, coconut oil, peanut oil, grapeseed oil and the mixtures of these oils. The vegetable oil is preferentially rich in oleic acid, that is to say that the fatty acid (or the combined fatty acids, if several are present) from which it derives comprises oleic acid in a weight fraction at least equal to 60%, even more preferentially in a weight fraction at least equal to 70%. Use is advantageously made, as vegetable oil, of a sunflower oil which is such that the combined fatty acids from which it derives comprise oleic acid in a weight fraction equal to or greater than 60%, preferably 70%, and, according to a particularly advantageous embodiment of the invention, in a weight fraction equal to or greater than 80%.

According to another specific embodiment of the invention, the liquid plasticizer is a triester selected from the group consisting of carboxylic acid triesters, phosphoric acid triesters, sulfonic acid triesters and the mixtures of these triesters.

Mention may be made, as examples of phosphate plasticizers, of those which comprise between 12 and 30 carbon atoms, for example trioctyl phosphate. Mention may in particular be made, as examples of carboxylic acid ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly consisting (for more than 50%, more preferably for more than 80%, by weight) of an unsaturated $C_{18}$ fatty acid, that is to say selected from the group consisting of oleic acid, linoleic acid, linolenic acid and the mixtures of these acids. The glycerol triester is preferred. More preferentially, whether it is of synthetic origin or natural origin (in the case, for example, of sunflower or rapeseed vegetable oils), the fatty acid used consists, for more than 50% by weight, even more preferentially for more than 80% by weight, of oleic acid. Such triesters (trioleates) with a high content of oleic acid are well known; they have been described, for example, in patent application WO 02/088238 as plasticizers in tyre treads.

When the plasticizer that is liquid at 23° C. is an ether plasticizer, it can, for example, be polyethylene glycol or polypropylene glycol.

Preferably, the plasticizer that is liquid at 23° C. is selected from the group comprising or consisting of MES oils, TDAE oils, naphthenic oils, vegetable oils and the mixtures of these plasticizers that are liquid at 23° C. More preferably, the plasticizer that is liquid at 23° C. is a vegetable oil, preferably a sunflower oil.

Also advantageously, the composition of the first layer of the laminate according to the invention does not comprise any liquid polymer.

Advantageously, the content of plasticizer that is liquid at 23° C., in the composition of the first layer of the laminate according to the invention, is within a range extending from 1 to 49 phr, preferably from 5 to 40 phr. Those skilled in the art clearly understand that when the content of the plasticizer that is liquid at 23° C. is lower than the minimum content of the plasticizing system comprising at least one plasticizer that is liquid at 23° C. and/or at least one plasticizing resin having a glass transition temperature above 20° C., the composition comprises at least the balance of the plasticizing resin having a glass transition temperature above 20° C. When the composition of the first layer of the laminate according to the invention comprises no resin having a glass transition temperature above 20° C., the content of the plasticizer that is liquid at 23° C. in the composition is advantageously within a range extending from 20 to 49 phr, preferably from 30 to 49 phr.

II-2.3 Reinforcing Filler

The composition of the first layer of the laminate in accordance with the invention may also comprise a reinforcing filler. Such a reinforcing filler typically consists of nanoparticles, the (weight-)average size of which is less than a micrometre, generally less than 500 nm, most often between 20 and 200 nm, in particular and more preferentially between 20 and 150 nm.

The reinforcing filler can comprise carbon black, silica, or a mixture thereof. The composition of the first layer of the laminate according to the invention can mainly consist of silica. Alternatively, it can mainly, preferably exclusively, consist of carbon black.

The content of reinforcing filler is adjusted by those skilled in the art according to the use of the rubber composition. Advantageously, the content of reinforcing filler, in the composition of the first layer of the laminate according to the invention, is within a range extending from 30 to 200 phr, preferably from 40 to 190 phr, preferably from 50 to 180 phr.

All carbon blacks, in particular the blacks conventionally used in tyres or their treads, are suitable as carbon blacks. Among said carbon blacks, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as carrier for some of the rubber additives used. The carbon blacks might, for example, be already incorporated in the diene elastomer, in particular isoprene elastomer, in the form of a masterbatch (see, for example, patent application WO97/36724-A2 or WO99/16600-A1).

Silicas that are suitable include any type of precipitated silica, in particular highly dispersible precipitated silicas (referred to as "HDS" for "highly dispersible" or "highly dispersible silica"). These precipitated silicas, which may or may not be highly dispersible, are well known to those skilled in the art. Mention may be made, for example, of the silicas described in patent applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silica, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

Use may be made, in order to couple the silica to the diene elastomer, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler, and a second functional group comprising a sulfur atom, said second functional group being able to interact with the diene elastomer.

Preferentially, the organosilanes are selected from the group consisting of (symmetrical or asymmetrical) organosilane polysulfides, such as bis(3-triethoxysilylpropyl) tetrasulfide, abbreviated to TESPT, sold under the name Si69 by Evonik, or bis(3-triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

When silica is used, the content of coupling agent in the composition of the first layer of the laminate of the invention can easily be adjusted by those skilled in the art. Typically, the content of coupling agent represents from 0.5% to 15% by weight with respect to the amount of silica.

II-2.4 Crosslinking System

The crosslinking system can be any type of system known to those skilled in the art in the field of rubber compositions for tyres. It may in particular be based on sulfur, and/or on peroxide and/or on bismaleimides.

Preferentially, the crosslinking system is based on sulfur; it is then called a vulcanization system. The sulfur can be provided in any form, in particular in the form of molecular sulfur or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or else known vulcanization retarders.

The sulfur is used at a preferential content of between 0.3 phr and 10 phr, more preferentially between 0.3 and 5 phr. The primary vulcanization accelerator is used at a preferential content of between 0.5 and 10 phr, more preferentially of between 0.5 and 5 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazole disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

II-2.5 Possible Additives

The composition of the first layer of the laminate which is useful for the purposes of the invention may also comprise all or some of the usual additives normally used in elastomer compositions intended for use in a tyre, such as, for example, processing agents, pigments, protective agents such as anti-ozone waxes, chemical anti-ozonants, antioxidants.

II-3 Composition of the Second Layer of the Laminate

II-3.1 Elastomer Matrix

According to the invention, the second layer consists of a rubber composition based on a diene elastomer having a weight content of diene units of greater than 50% and a crosslinking system.

Advantageously, the diene elastomer having a weight content of diene units of greater than 50% of the composition of the second layer is selected from the group consisting of polybutadienes (BRs), natural rubber (NR), synthetic polyisoprenes (IRs), butadiene copolymers, isoprene copolymers and the mixtures of these elastomers.

Preferably, the diene elastomer having a weight content of diene units of greater than 50% of the composition of the second layer is selected from the group consisting of isoprene elastomers.

Advantageously, the isoprene elastomer is a polyisoprene comprising a weight content of cis-1,4 bonds of at least 90%, preferably at least 98%, of the weight of the polyisoprene.

Preferably, the polyisoprene is selected from the group consisting of natural rubber, synthetic polyisoprenes, and mixtures thereof. More preferably, the polyisoprene is a natural rubber.

Particularly advantageously, the diene elastomer having a weight content of diene units of greater than 50% of the first layer and the diene elastomer having a weight content of diene units of greater than 50% of the second layer are polyisoprenes, which may be identical or different. Preferably, the diene elastomer having a weight content of diene units of greater than 50% of the first layer and the diene elastomer having a weight content of diene units of greater than 50% of the second layer are polyisoprenes comprising a weight content of cis-1,4 bonds of at least 90%, preferably of at least 98%, of the weight of the polyisoprene.

Advantageously, the elastomer matrix of the composition of the second layer of the laminate according to the invention predominantly comprises the diene elastomer having a weight content of diene units of greater than 50%. The content of the diene elastomer having a weight content of diene units of greater than 50% in the composition of the second layer of the laminate according to the invention is advantageously within a range extending from 60 to 100 phr, preferably from 80 to 100 phr, more preferably from 90 to 100 phr. Particularly advantageously, the content of the diene elastomer having a weight content of diene units of greater than 50% in the composition of the second layer of the laminate according to the invention is 100 phr.

II-3.2 Reinforcing Filler

The composition of the second layer of the laminate in accordance with the invention may also comprise a reinforcing filler. The reinforcing filler of the second layer can comprise carbon black, silica, or a mixture thereof. Advantageously, the composition of the second layer of the laminate according to the invention consists mainly, preferably exclusively, of carbon black. The composition of the second layer of the laminate according to the invention could alternatively mainly consist of silica.

The content of reinforcing filler is adjusted by those skilled in the art according to the use of the rubber composition. Advantageously, the content of reinforcing filler, in the composition of the second layer of the laminate according to the invention, is within a range extending from 20 to 80 phr, preferably from 25 to 70 phr, preferably from 30 to 60 phr.

The nature of the reinforcing filler may be as described previously for the composition of the first layer of the laminate, without however the reinforcing filler of the first layer and that of the second layer necessarily being identical.

When silica is used in the second layer of the laminate according to the invention, the content of coupling agent in the composition of the second layer of the laminate of the invention can easily be adjusted by those skilled in the art. Typically, the content of coupling agent represents from 0.5% to 15% by weight with respect to the amount of silica.

II-3.3 Crosslinking System

The crosslinking system can be any type of system known to those skilled in the art in the field of rubber compositions for tyres. It may in particular be based on sulfur, and/or on peroxide and/or on bismaleimides.

Preferentially, the crosslinking system is based on sulfur; it is then called a vulcanization system. The sulfur can be provided in any form, in particular in the form of molecular sulfur or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or else known vulcanization retarders.

The sulfur is used at a preferential content of between 0.3 phr and 10 phr, more preferentially between 0.3 and 5 phr. The primary vulcanization accelerator is used at a preferential content of between 0.5 and 10 phr, more preferentially of between 0.5 and 5 phr.

It is possible to use as accelerator any compound capable of acting as an accelerator for the vulcanization of diene elastomers in the presence of sulfur, those described above for the composition of the first layer of the laminate, without however these accelerators necessarily being identical.

II-3.4 Possible Additives

The composition of the second layer of the laminate which is useful for the purposes of the invention may also comprise all or some of the usual additives normally used in elastomer compositions intended for use in a tyre, such as, for example, processing agents, plasticizers, pigments, protective agents such as anti-ozone waxes, chemical antiozonants, antioxidants.

II-4 Preparation of the Rubber Compositions

The compositions that can be used in the laminate according to the invention can be manufactured in appropriate mixers using two successive preparation phases well known to those skilled in the art:

- a first phase of thermomechanical working or kneading ("non-productive" phase), which can be carried out in a single thermomechanical stage during which all the necessary constituents, in particular the elastomer matrix, the reinforcing filler and the optional other various additives, with the exception of the crosslinking system, are introduced into an appropriate mixer, such as a standard internal mixer (for example of 'Banbury' type). The optional filler can be incorporated into the elastomer in one or more portions while thermomechanically kneading. In the case where the filler is already incorporated, totally or partly, in the elastomer in the form of a masterbatch, as is described, for example, in patent application WO 97/36724 or WO 99/16600, it is the masterbatch which is directly kneaded and, if appropriate, the other elastomers or fillers present in the composition which are not in the masterbatch form, and also the various other optional additives other than the crosslinking system, are incorporated. The non-productive phase can be carried out at high temperature, up to a maximum temperature of between 110° C. and 200° C., preferably between 130° C. and 185° C., for a period of time generally of between 2 and 10 minutes;
- a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

Such phases have been described, for example, in patent applications EP-A-0501227, EP-A-0735088, EP-A-0810258, WO 00/05300 or WO 00/05301.

The final composition thus obtained is then calendered, for example in the form of a sheet or of a slab, in particular for characterization in the laboratory, or else extruded (or co-extruded with another rubber composition) in the form of a rubber semi-finished product (or profiled element). The first and the second layer can be produced separately, then arranged one on the other during the manufacture of the tyre, according to the techniques known to those skilled in the art.

The composition of the laminate can be either in the uncured state (before crosslinking or vulcanization) or in the cured state (after crosslinking or vulcanization). The laminate can be a semi-finished product which can be used in a tyre.

The crosslinking (or curing), where appropriate the vulcanization, is carried out in a known manner at a temperature generally of between 130° C. and 200° C., for a sufficient time which may vary, for example, between 5 and 90 min, depending especially on the curing temperature, on the crosslinking system adopted and on the crosslinking kinetics of the composition in question.

II-5 Rubber Article

Another subject of the present invention is a rubber article comprising at least one laminate according to the invention. The rubber article can be selected from the group consisting of pneumatic tyres, non-pneumatic tyres, caterpillar tracks, conveyor belts and anti-vibratory articles. Preferably, the rubber article is selected from the group consisting of pneumatic tyres, non-pneumatic tyres and conveyor belts. More preferably, the rubber article is a pneumatic or non-pneumatic tyre.

More particularly, another subject of the invention is a pneumatic or non-pneumatic tyre provided with a tread comprising the composition of the first layer of the laminate according to the invention. Preferably, the first layer of the laminate constitutes a portion or all of the tyre tread and the second layer of the laminate constitutes a portion or all of a tread underlayer.

Another subject of the present invention is a pneumatic tyre wherein the first layer of the laminate constitutes a portion or all of at least one sidewall of the tyre and the second layer of the laminate constitutes a portion or all of a carcass ply.

The tyre according to the invention can be intended to equip any type of vehicle, in particular motor vehicle, without any particular limitation.

III— PREFERRED EMBODIMENTS

In the light of the above, the preferred embodiments of the invention are described below:

1. Elastomer laminate comprising at least two adjacent layers:

the first layer consisting of a rubber composition based on:

20 to 100 phr of at least one copolymer comprising ethylene units and units of a 1,3-diene of formula (I), the ethylene units in the copolymer representing more than 50 mol % of the monomer units of the copolymer, $$CH_2{=}CR{-}CH{=}CH_2 \quad (I)$$

the symbol R representing a hydrocarbon chain having 3 to 20 carbon atoms;

0 to 80 phr of at least one diene elastomer having a weight content of diene units of greater than 50%;

10 to 100 phr of a plasticizing system comprising at least one plasticizing resin having a glass transition temperature above 20° C. and/or at least one plasticizer that is liquid at 23° C.;

a reinforcing filler; and a crosslinking system, the second layer consisting of a rubber composition based on a diene elastomer having a weight content of diene units of greater than 50% and a crosslinking system.

2. Laminate according to embodiment 1, wherein the copolymer of the first layer contains ethylene units which represent between 50 mol % and 95 mol %, preferably from 60 mol % to 90 mol %, preferably from 70 mol % to 85 mol %, of the monomer units of the copolymer.

3. Laminate according to either one of the preceding embodiments, wherein the symbol R of the copolymer of the first layer represents a hydrocarbon chain having 6 to 16 carbon atoms.

4. Laminate according to any one of the preceding embodiments, wherein the symbol R of the copolymer of the first layer represents an aliphatic chain.

5. Laminate according to any one of the preceding embodiments, wherein the symbol R of the copolymer of the first layer represents an acyclic chain.

6. Laminate according to any of the preceding embodiments, wherein the symbol R of the copolymer of the first layer represents a linear or branched chain.

7. Laminate according to any one of the preceding embodiments, wherein the 1,3-diene of formula (I) of the copolymer of the first layer is myrcene, β-farnesene or a mixture of myrcene and β-farnesene.

8. Laminate according to any one of the preceding embodiments, wherein the copolymer of the first layer contains units of the 1,3-diene of formula (I) which represent between 1 mol % and 50 mol %, preferably between 1 mol % and 30 mol %, preferably between 5 mol % and 30 mol %, of the monomer units of the copolymer.

9. Laminate according to any one of the preceding embodiments, wherein the copolymer is a copolymer further comprising a second 1,3-diene selected from 1,3-butadiene, isoprene or a mixture thereof.

10. Laminate according to embodiment 9, wherein the second 1,3-diene of the copolymer is 1,3-butadiene.

11. Laminate according to either one of embodiments 9 and 10, wherein the copolymer of the first layer contains units of the second 1,3-diene which represent between 1 mol % and 49 mol %, preferably between 4 mol % and 29 mol %, preferably between 4 mol % and 25 mol %, of the monomer units of the copolymer.

12. Laminate according to any of the preceding embodiments, wherein the copolymer is a random copolymer.

13. Laminate according to any one of the preceding embodiments, in which the copolymer of the first layer has a glass transition temperature below −35° C., preferably between −90° C. and −35° C., preferably between −70° C. and −35° C.

14. Laminate according to any one of the preceding embodiments, wherein the content of the copolymer of ethylene and of a 1,3-diene of formula (I) in the composition of the first layer is within a range extending from more than 50 to 100 phr, preferably from 75 to 100 phr, more preferably from 90 to 100 phr.

15. Laminate according to embodiment 14, wherein the diene elastomer having a weight content of diene units of greater than 50% is present in the composition of the first layer at a content within a range extending from 0 to less than 50 phr, preferably from 0 to 25 phr, more preferably from 0 to 10 phr.

16. Laminate according to any one of embodiments 1 to 13, wherein the content of the copolymer of ethylene and of a 1,3-diene of formula (I) in the composition of the first layer is within a range extending from 20 to 90 phr, preferably from 25 to 80 phr, more preferably from 30 to 80 phr.

17. Laminate according to embodiment 16, wherein the diene elastomer having a weight content of diene units of greater than 50% is present in the composition of the first layer at a content within a range extending from 10 to 80 phr, preferably 20 to 75 phr, more preferably 20 to 70 phr.

18. Laminate according to any one of the preceding embodiments, wherein the composition of the first layer does not comprise any elastomer other than the copolymer of ethylene and of a 1,3-diene of formula (I) and the diene elastomer having a weight content of diene units of greater than 50%.

19. Laminate according to any one of the preceding embodiments, wherein the diene elastomer having a weight content of diene units of greater than 50% of the composition of the first layer is selected from the group consisting of polybutadienes (BRs), natural rubber (NR), synthetic polyisoprenes (IRs), butadiene copolymers, isoprene copolymers and the mixtures of these elastomers.

20. Laminate according to any one of the preceding embodiments, wherein the diene elastomer having a weight content of diene units of greater than 50% of the composition of the first layer is a polyisoprene, preferably comprising a weight content of cis-1,4 bonds of at least 90%, preferably at least 98%, of the weight of the polyisoprene.

21. Laminate according to embodiment 20, wherein the polyisoprene of the composition of the first layer is selected from the group consisting of natural rubber, synthetic polyisoprenes or mixtures thereof.

22. Laminate according to any one of the preceding embodiments, wherein the content of the plasticizing system comprising at least one plasticizer that is liquid at 23° C. and/or at least one plasticizing resin having a glass transition temperature above 20° C., in the composition of the first layer, is within a range extending from 35 to 100 phr, preferably from 50 to 95 phr, more preferably from 55 to 90 phr.

23. Laminate according to any one of the preceding embodiments, wherein the plasticizing system comprises a plasticizer that is liquid at 23° C. and a plasticizing resin having a glass transition temperature above 20° C.

24. Laminate according to any one of the preceding embodiments, wherein the plasticizer that is liquid at 23° C. of the composition of the first layer is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulfonate plasticizers and mixtures thereof.
25. Laminate according to any one of the preceding embodiments, wherein the content of plasticizer that is liquid at 23° C., in the composition of the first layer, is within a range extending from 1 to 49 phr, preferably from 5 to 40 phr.
26. Laminate according to any one of the preceding embodiments, wherein the plasticizing resin having a glass transition temperature above 20° C. of the composition of the first layer is selected from the group consisting of cyclopentadiene homopolymer or copolymer resins, dicyclopentadiene homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and mixtures thereof.
27. Laminate according to any one of the preceding embodiments, wherein the content of plasticizing resin having a glass transition temperature above 20° C., in the composition of the first layer, is within a range extending from 1 to 99 phr, preferably from 5 to 95 phr.
28. Laminate according to any one of the preceding embodiments, wherein the reinforcing filler of the composition of the first layer comprises carbon black, silica or a mixture thereof.
29. Laminate according to any one of the preceding embodiments, wherein the content of reinforcing filler in the composition of the first layer is within a range extending from 30 to 200 phr, preferably from 40 to 190 phr, preferably from 50 to 180 phr.
30. Laminate according to any one of the preceding embodiments, wherein the crosslinking system of the first layer is a vulcanization system comprising molecular sulfur and/or at least one sulfur-donating agent.
31. Laminate according to any one of the preceding embodiments, wherein the diene elastomer having a weight content of diene units of greater than 50% of the composition of the second layer is selected from the group consisting of polybutadienes (BRs), natural rubber (NR), synthetic polyisoprenes (IRs), butadiene copolymers, isoprene copolymers and the mixtures of these elastomers.
32. Laminate according to any one of the preceding embodiments, wherein the diene elastomer having a weight content of diene units of greater than 50% of the composition of the second layer is a polyisoprene, preferably comprising a weight content of cis-1,4 bonds of at least 90%, preferably at least 98%, of the weight of the polyisoprene.
33. Laminate according to embodiment 32, wherein the polyisoprene of the composition of the second layer is selected from the group consisting of natural rubber, synthetic polyisoprenes or mixtures thereof.
34. Laminate according to any one of the preceding embodiments, wherein the diene elastomer having a weight content of diene units of greater than 50% of the first layer and the diene elastomer having a weight content of diene units of greater than 50% of the second layer are polyisoprenes.
35. Laminate according to any one of the preceding embodiments, wherein the diene elastomer having a weight content of diene units of greater than 50% of the first layer and the diene elastomer having a weight content of diene units of greater than 50% of the second layer are polyisoprenes comprising a weight content of cis-1,4 bonds of at least 90%, preferably of at least 98%, of the weight of the polyisoprene.
36. Laminate according to any one of the preceding embodiments, wherein the diene elastomer having a weight content of diene units of greater than 50% is present in the composition of the second layer at a content within a range extending from 60 to 100 phr, preferably 80 to 100 phr, more preferably 90 to 100 phr.
37. Laminate according to any one of the preceding embodiments, wherein the composition of the second layer comprises a reinforcing filler.
38. Laminate according to embodiment 37, wherein the reinforcing filler of the composition of the second layer consists predominantly, preferably exclusively, of carbon black.
39. Laminate according to embodiment 37, wherein the reinforcing filler of the composition of the second layer consists predominantly of silica.
40. Laminate according to any one of embodiments 37 to 39, wherein the content of reinforcing filler in the composition of the second layer is within a range extending from 20 to 80 phr, preferably from 25 to 70 phr, preferably from 30 to 60 phr.
41. Laminate according to any one of the preceding embodiments, wherein the crosslinking system of the second layer is a vulcanization system comprising molecular sulfur and/or at least one sulfur-donating agent.
42. Laminate according to any one of the preceding embodiments, wherein the first layer has a thickness within a range extending from 0.5 to 120 mm, preferably from 1 to 15 mm, or from 0.2 to 120 mm, preferably from 0.3 to 15 mm.
43. Laminate according to any one of embodiments 1 to 41, wherein the first layer has a thickness within a range extending from 0.2 to 10 mm, preferably from 0.3 to 5 mm.
44. Laminate according to any one of the preceding embodiments, wherein the second layer has a thickness within a range extending from 0.2 to 10 mm, preferably from 0.3 to 7 mm.
45. Rubber article comprising a laminate defined in any one of embodiments 1 to 43.
46. Rubber article according to embodiment 45, said article being selected from the group consisting of pneumatic tyres, non-pneumatic tyres, caterpillar tracks, conveyor belts and anti-vibratory articles, preferably from the group consisting of pneumatic tyres, non-pneumatic tyres and conveyor belts.
47. Pneumatic or non-pneumatic tyre comprising a laminate defined in any one of embodiments 1 to 44, wherein the first layer of the laminate constitutes a portion or all of the tyre tread and the second layer of the laminate constitutes a portion or all of a tread underlayer.
48. Pneumatic or non-pneumatic tyre comprising a laminate defined in any one of embodiments 1 to 44, wherein the first layer of the laminate constitutes a portion or all of at least one sidewall of the tyre and the second layer of the laminate constitutes a portion or all of a carcass ply.

IV— EXAMPLES

IV-1 Measurements and Tests Used

IV-1.1 Determination of the Microstructure of the Elastomers:

a) Determination of the Microstructure of the Ethylene-Butadiene Copolymers (Elastomer E1):

The microstructure of the ethylene-butadiene copolymers is determined by $^1H$ NMR analysis, assisted by $^{13}C$ NMR analysis when the resolution of the $^1H$ NMR spectra does not make it possible to assign and quantify all the species. The measurements are performed using a Bruker 500 MHz NMR spectrometer at frequencies of 500.43 MHz for proton observation and 125.83 MHz for carbon observation. For the elastomers which are insoluble but which have the ability to swell in a solvent, a 4 mm z-grad HR-MAS probe is used for proton and carbon observation in proton-decoupled mode. The spectra are acquired at rotational speeds of from 4000 Hz to 5000 Hz. For the measurements on soluble elastomers, a liquid NMR probe is used for proton and carbon observation in proton-decoupled mode. The preparation of the insoluble samples is performed in rotors filled with the analysed material and a deuterated solvent enabling swelling, generally deuterated chloroform ($CDCl_3$). The solvent used must always be deuterated and its chemical nature may be adapted by those skilled in the art. The amounts of material used are adjusted so as to obtain spectra of sufficient sensitivity and resolution. The soluble samples are dissolved in a deuterated solvent (about 25 mg of elastomer in 1 ml), generally deuterated chloroform ($CDCl_3$). The solvent or solvent blend used must always be deuterated and its chemical nature may be adapted by those skilled in the art. In both cases (soluble sample or swollen sample): A 300 single pulse sequence is used for proton NMR. The spectral window is set to observe all of the resonance lines belonging to the analysed molecules. The accumulation number is adjusted in order to obtain a signal to noise ratio that is sufficient for the quantification of each unit. The recycle delay between each pulse is adapted to obtain a quantitative measurement. A 30° single pulse sequence is used for carbon NMR, with proton decoupling only during the acquisition to avoid nuclear Overhauser effects (NOE) and to remain quantitative. The spectral window is set to observe all of the resonance lines belonging to the analysed molecules. The accumulation number is adjusted in order to obtain a signal to noise ratio that is sufficient for the quantification of each unit. The recycle delay between each pulse is adapted to obtain a quantitative measurement. The NMR measurements are performed at 25° C.

b) Determination of the Microstructure of the Ethylene-Myrcene Copolymers (Elastomer E2):

The spectral characterization and the measurements of the microstructure of the ethylene-myrcene copolymers are carried out by nuclear magnetic resonance (NMR) spectroscopy.

Spectrometer: For these measurements, a Bruker Avance III HD 400 MHz spectrometer is used, equipped with a Bruker 5 mm z-grad cryo-BBFO probe.

Experiments: The $^1H$ experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1H$-$^{13}C$ NMR correlation experiments are recorded with a number of repetitions of 128 and a number of increments of 128. The experiments are carried out at 25° C.

Preparation of the sample: 25 mg of sample are dissolved in 1 ml of deuterated chloroform ($CDCl_3$).

Sample calibration: The axes of the $^1H$ and $^{13}C$ chemical shifts are calibrated with respect to the protonated impurity of the solvent ($CHCl_3$) at $\delta_{1H}$=7.2 ppm (for the most shielded signal) and $\delta_{13C}$=77 ppm (for the least shielded signal).

Spectral assignment for the copolymers of ethylene and of 1,3-myrcene: In the representations A, B and C below, the symbols R1 and R2 represent the attachment points of the unit to the polymer chain. The signals of the insertion forms of the 1,3-diene A, B and C were observed on the different spectra recorded. According to S. George et al., (Polymer 55 (2014) 3869-3878), the signal of the —CH=group No. 8" characteristic of form C exhibits $^1H$ and $^{13}C$ chemical shifts identical to the —CH=group No. 3. The chemical shifts of the signals characteristic of the moieties A, B and C are presented in Table 1. The moieties A, B and C correspond respectively to the units of 3,4 configuration, of 1,2 configuration and of trans-1,4 configuration. The quantifications were carried out from the integration of the 1D $^1H$ NMR spectra using the Topspin software. The integrated signals for the quantification of the various moieties are:

- Ethylene: signal at 1.2 ppm corresponding to 4 protons
- Total myrcene: signal No. 1 (1.59 ppm) corresponding to 6 protons
- Form A: signal No. 7 (4.67 ppm) corresponding to 2 protons
- Form B: signal No. 8' (5.54 ppm) corresponding to 1 proton.

The quantification of the microstructure is carried out in molar percentage (molar %) as follows: Molar % of a moiety=$^1H$ integral of a moiety×100/E($^1H$ integrals of each moiety).

TABLE 1

| $\delta_{1H}$ (ppm) | $\delta_{13C}$ (ppm) | Group |
|---|---|---|
| 5.54 | 146.4 | 8' |
| 5.07 | 124.6 | 3 + 8" |
| 4.97-4.79 | 112.0 | 9' |
| 4.64 | 108.5 | 7 |
| 2.03 | 26.5 | 4 |
| 2.0-1.79 | 31.8 | 5 + 5' + 5" |
| | 44.5 | 8 |
| 1.59 | 25.9 and 17.0 | 1 |
| 1.2 | 36.8-24.0 | ethylene $CH_2$ |

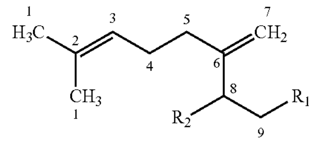

A

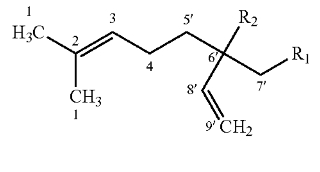

B

-continued

C

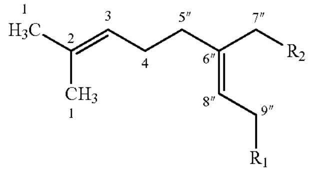

c) Determination of the Microstructure of the Ethylene-Butadiene-Myrcene Terpolymers (Elastomer E3):

The spectral characterization and the measurements of the ethylene-butadiene-myrcene copolymer microstructure are carried out by nuclear magnetic resonance (NMR) spectroscopy.

For these measurements, a Bruker Avance III HD 400 MHz spectrometer is used, equipped with a Bruker 5 mm z-grad cryo-BBFO probe. The $^{1}H$ experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation)$^{1}H$-$^{13}C$ NMR correlation experiments are recorded with a number of repetitions of 128 and a number of increments of 128. The experiments are carried out at 25° C.

25 mg of sample are dissolved in 1 ml of deuterated ortho-dichlorobenzene (ODCB).

The axes of the $^{1}H$ and $^{13}C$ chemical shifts are calibrated with respect to the protonated impurity of the solvent at $\delta_{1H}$=7.2 ppm (for the most shielded signal) and $\delta_{13C}$=127 ppm (for the least shielded signal).

The possible monomer units in the terpolymer are $-CH_2-CH(CH=CH_2)-$, $-CH_2-CH=CH-CH_2-$, $-CH_2-CH_2-$, the 1,2-cyclohexanediyl moiety and the following structures, $R_1$ and $R_2$ representing the polymer chain:

A

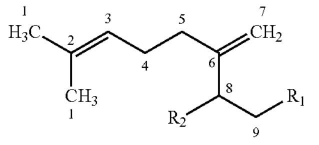

B

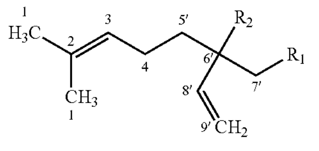

C

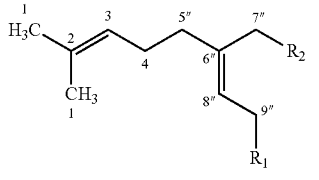

The 1,2-cyclohexanediyl moiety has the following structure:

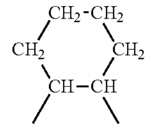

The signals of the insertion forms of myrcene A were observed on the different spectra recorded. According to S. Georges et al. (S. Georges, M. Bria, P. Zinck and M. Visseaux., Polymer, 55 (2014), 3869-3878), the signal of the —CH=group No. 8" characteristic of the form C exhibits identical $^{1}H$ and $^{13}C$ chemical shifts to the —CH=group No. 3.

The chemical shifts of the signals characteristic of the polymer are presented in Table 2 (Assignment of the $^{1}H$ and $^{13}C$ signals of the ethyl ene-butadiene-myrcene terpolymers other than those of the units of the 1,3-butadiene).

TABLE 2

| $\delta_{1H}$ (ppm) | $\delta_{13C}$ (ppm) | Group |
|---|---|---|
| 5.19 | 125.1 | 3 + 8" |
| 4.86 | 109.0 | 7 |
| 1.59 and 1.68 | 247 and 17.6 | 1 |
| 1.3 | 37.5-24.0 | ethylene $CH_2$ |

The quantifications were carried out from the integration of the 1D $^{1}H$ NMR spectra using the Topspin software.

The integrated signals for the quantification of the various moieties are:

Ethylene: All of the signals between 0.5 ppm and 3.0 ppm by subtracting the aliphatic contributions of the other moieties of the terpolymer. The calculation corresponds to 4 protons of the ethylene moiety.

Form A: signal No. 7 (4.86 ppm) corresponding to 2 protons.

The proportion of form C is not directly accessible but can be calculated from the signal No. 3+8" by subtracting the contribution of the form A.

PB1-4: Signal between 5.71 ppm and 5.32 ppm corresponds to 2 protons (by removing the PB1-2 contribution).

PB1-2: signal between 5.11 ppm and 4.92 ppm corresponds to 2 protons.

Cyclohexane rings: signal between 1.80 ppm and 1.70 ppm corresponds to 2 protons.

The quantification of the microstructure is carried out in molar percentage (molar %) as follows:

$$\text{molar \% of a moiety} = {}^{1}\text{H integral of a moiety}*100/\Sigma\ ({}^{1}\text{H integrals of each moiety}).$$

c) Determination of the microstructure of the ethylene-butadiene-farnesene terpolymers (Elastomers E4 and E5):

The spectral characterization and the measurements of the ethylene-butadiene-farnesene copolymer microstructure are carried out by Nuclear Magnetic Resonance (NMR) spectroscopy. For these measurements, a Bruker Avance III HD 400 MHz spectrometer is used, equipped with a Bruker 5 mm z-grad cryo-BBFO probe. The $^{1}H$ experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation)$^{1}H$-$^{13}C$ NMR correlation experiments are recorded with a number of repetitions of 128 and a number of increments of 128. The experiments are carried out at 25° C.

25 mg of sample are dissolved in 1 ml of deuterated ortho-dichlorobenzene (ODCB). The axes of the $^1H$ and $^{13}C$ chemical shifts are calibrated with respect to the protonated impurity of the solvent at $\delta_{1H}$=7.2 ppm (for the most shielded signal) and $\delta_{13C}$=127 ppm (for the least shielded signal). The possible monomer units in the terpolymer are $—CH_2—CH(CH{=}CH_2)—$, $—CH_2—CH{=}CH—CH_2—$, $—CH_2—CH_2—$, the 1,2-cyclohexanediyl moiety and the following structures, $R_1$ and $R_2$ representing the polymer chain.

A

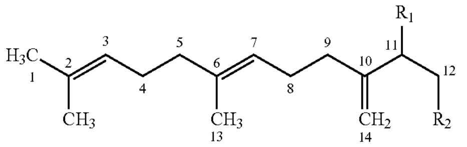

B

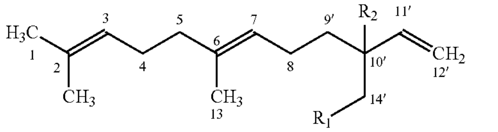

C

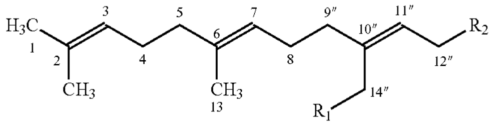

The signals of the insertion form of farnesene A were observed on the different spectra recorded. The signal of the —CH=group No. 11" characteristic of the form C exhibits identical $^1H$ and $^{13}C$ chemical shifts to the —CH=groups No. 3 and No. 7.

The chemical shifts of the signals characteristic of the polymer are presented in Table 3 (Assignment of the $^1H$ and $^{13}C$ signals of the ethylene-butadiene-farnesene terpolymers other than those of the units of the 1,3-butadiene).

TABLE 3

| $\delta_{1H}$ (ppm) | $\delta_{13C}$ (ppm) | Group |
|---|---|---|
| 5.25 | 125.0 | 7 |
| 5.15 | 125.0 | 3, 11" |
| 4.87 | 109.0 | 14 |
| 1.59 and 1.67 | 24.6 and 17.5 | 1, 13 |
| 1.28 | 38-24.0 | ethylene $CH_2$ |

The quantifications were carried out from the integration of the 1D $^1H$ NMR spectra using the Topspin software.

The integrated signals for the quantification of the various moieties are: Farnesene moiety form A from the signal No. 14 $CH_2$= for 2 protons, Farnesene moiety form C from the signals No. 3, 11" and No. 7 CH=(by subtracting the contribution of the form A), for 2 protons, Farnesene moiety form B: from the signal No. 11', specific to this form, for 1 proton.

PB1-4: Signal between 5.71 ppm and 5.32 ppm corresponds to 2 protons (by removing the PB1-2 contribution).

PB1-2: signal between 5.11 ppm and 4.92 ppm corresponds to 2 protons.

Cyclohexane rings: signal between 1.80 ppm and 1.70 ppm corresponds to 2 protons.

Ethylene moiety by integrating all of the aliphatic signals (from ~0.5 to 3 ppm) and by subtracting the contribution of all the other aliphatic moieties (PB1-4, PB1-2, EBR ring, farnesene forms A and C).

The quantification of the microstructure is carried out in molar percentage (molar %) as follows:

molar % of a moiety=$^1H$ integral of a moiety*100/Σ ($^1H$ integrals of each moiety).

IV-1.2 Determination of the Glass Transition Temperature of the Polymers:

The glass transition temperature is measured by means of a differential calorimeter (differential scanning calorimeter) according to Standard ASTM D3418 (1999).

IV-1.3 Determination of the Macrostructure of the Polymers by Size Exclusion Chromatography (SEC):

a) Principle of the Measurement:

Size-exclusion chromatography or SEC makes it possible to separate macromolecules in solution according to their size by passage through columns packed with a porous gel. The macromolecules are separated according to their hydrodynamic volume, the bulkiest being eluted first.

In combination with 3 detectors (3D)—a refractometer, a viscometer and a 900 light-scattering detector—SEC gives a picture of the distribution of the absolute molar masses of a polymer. The various number-average (Mn) and weight-average (Mw) absolute molar masses and the dispersity (D=Mw/Mn) can also be calculated.

b) Preparation of the Polymer:

Each sample is dissolved in tetrahydrofuran at a concentration of approximately 1 g/l. The solution is then filtered through a filter with a porosity of 0.45 μm before injection.

c) 3D Sec Analysis:

In order to determine the number-average molar mass (Mn), and if appropriate the weight-average molar mass (Mw) and the polydispersity index (PI), of the polymers, the method below is used.

The number-average molar mass (Mn), the weight-average molar mass (Mw) and the polydispersity index of the polymer (hereinafter sample) are determined in an absolute manner by triple detection size exclusion chromatography (SEC). Triple detection size exclusion chromatography has the advantage of measuring average molar masses directly without calibration.

The value of the refractive index increment dn/dc of the sample solution is measured online using the area of the peak detected by the refractometer (RI) of the liquid chromatography equipment. To apply this method, it must be verified that 100% of the sample mass is injected and eluted through the column. The area of the RI peak depends on the concentration of the sample, on the constant of the RI detector and on the value of the dn/dc.

In order to determine the average molar masses, use is made of the 1 g/l solution previously prepared and filtered, which is injected into the chromatographic system. The apparatus used is a Waters Alliance chromatographic line. The elution solvent is tetrahydrofuran containing 250 ppm of BHT (2,6-di(tert-butyl)-4-hydroxytoluene), the flow rate is 1 ml·min$^{-1}$, the temperature of the system is 35° C. and the analytical time is 60 min. The columns used are a set of three Agilent columns of PL Gel Mixed B LS trade name. The volume of the solution of the sample injected is 100 μl. The detection system is composed of a Wyatt differential viscometer of Viscostar II trade name, of a Wyatt differential refractometer of Optilab T-Rex trade name of wavelength 658 nm and of a Wyatt multi-angle static light scattering detector of wavelength 658 nm and of Dawn Heleos 8+ trade name.

For the calculation of the number-average molar masses and the polydispersity index, the value of the refractive index increment dn/dc of the solution of the sample obtained above is integrated. The software for processing the chromatographic data is the Astra system from Wyatt.

IV-2 Synthesis of the Polymers:

In the synthesis of polymers, all the reactants are obtained commercially except the metallocenes. The butyloctylmagnesium BOMAG (20% in heptane, C=0.88 $mol.l^{-1}$) originates from Chemtura and is stored in a Schlenk tube under an inert atmosphere. The ethylene, of N35 grade, is obtained from the company Air Liquide and is used without prior purification. The myrcene (purity≥95%) and farnesene (purity≥95%) are obtained from Sigma-Aldrich.

The following polymers are synthesized according to the procedure described below:

- copolymer of ethylene and 1,3-butadiene: elastomer E1 (not in accordance with the invention)
- copolymer of ethylene and myrcene: elastomer E2 (in accordance with the invention)
- copolymer of ethylene, butadiene and farnesene: elastomer E3 (in accordance with the invention)
- copolymers of ethylene, butadiene and myrcene: elastomers E4 and E5 (in accordance with the invention)

To a reactor containing, at 80° C., methylcyclohexane and also ethylene (Et) and butadiene (Bd) and/or myrcene (Myr) and/or farnesene (Far) in the proportions indicated in Table 4, butyloctylmagnesium (BOMAG) is added to neutralize the impurities in the reactor, then the catalytic system is added (see Table 4). At this time, the reaction temperature is regulated at 80° C. and the polymerization reaction starts. The polymerization reaction takes place at a constant pressure of 8 bar. The reactor is fed throughout the polymerization with ethylene and butadiene (Bd) and/or myrcene (Myr) and/or farnesene (Far) in the proportions defined in Table 4. The polymerization reaction is stopped by cooling, degassing of the reactor and addition of ethanol. An antioxidant is added to the polymer solution. The copolymer is recovered by drying in an oven under vacuum to constant weight. The catalytic system is a preformed catalytic system. It is prepared in methylcyclohexane from a metallocene, $[Me_2SiFlu_2Nd(—BH_4)_2Li(THF)]$, a co-catalyst, butyloctylmagnesium (BOMAG), and a preformation monomer, 1,3-butadiene, in the contents indicated in Table 4. It is prepared according to a preparation method in accordance with paragraph II.1 of patent application WO 2017/093654 A1.

The microstructure of the elastomers E1 to E5 and the properties thereof are shown in Tables 5 and 6. For the microstructure, Table 5 indicates the molar contents of the ethylene (Eth) units, the 1,3-butadiene units, the 1,2-cyclohexanediyl (ring) moieties, and β-farnesene or myrcene units. Also shown therein is the molar proportion of the β-farnesene or myrcene units according to whether they are of 1,4 configuration, 1,2 configuration or 3,4 configuration.

TABLE 4

| Synthesis | E1 | E2 | E3 | E4 | E5 |
|---|---|---|---|---|---|
| Metallocene concentration (mmol/l) | 0.07 | 0.09 | 0.09 | 0.09 | 0.09 |
| Alkylating agent concentration (mmol/l) | 0.36 | 0.17 | 0.25 | 0.2 | 0.33 |
| Preformation monomer/Nd metal molar ratio | 90 | 90 | 90 | 90 | 90 |
| Composition of the feed (mol % Et/Bd) | 80/20 | — | — | — | — |
| Composition of the feed (mol % Et/Myr) | — | 60/40 | — | — | — |
| Composition of the feed (mol % Eth/Btd/Far) | — | — | 81/9/10 | — | — |
| Composition of the feed (mol % Eth/Btd/Myr) | — | — | — | 79/14/7 | 70/20/10 |

TABLE 5

| Elastomer | E1 | E2 | E3 | E4 | E5 |
|---|---|---|---|---|---|
| Et (mol %) | 77 | 74 | 76 | 75 | 68 |
| Bd (mol %) | 15 | — | 8 | 13 | 19 |
| 1,2-Cyclohexanediyl (mol %) | 8 | — | 5 | 6 | 7 |
| Far or Myr (mol %) | — | 26 | 11 | 6 | 6 |
| 1,4 Far or Myr (mol %/mol % Far or Myr) | — | 31 | 36 | 33 | 33 |
| 1,2 Far or Myr (mol %/mol % Far or Myr) | — | 4 | <1 | <1 | <1 |
| 3,4 Far or Myr (mol %/mol % Far or Myr) | — | 65 | 64 | 67 | 67 |

TABLE 6

| Elastomer | E1 | E2 | E3 | E4 | E5 |
|---|---|---|---|---|---|
| Tg (° C.) | −40 | −60 | −61 | −49 | −49 |
| Mn (g/mol) | 128,888 | 367,400 | 200,800 | 298,000 | 179,500 |

IV-3 Preparation of the Rubber Compositions:

In the examples which follow, the rubber compositions were produced as described in point II-4 above. In particular, the “non-productive” phase was carried out in a 3 litre mixer for 5 minutes, for a mean blade speed of 50 revolutions per minute, until a maximum dropping temperature of 160° C. was reached. The “productive” phase was carried out in an open mill at 23° C. for 10 minutes.

IV-4 Rubber Tests:

The adhesion of several rubber compositions comprising a copolymer containing ethylene units and 1,3-diene units to a composition based on natural rubber was compared according to the nature of the copolymer and the content of plasticiser in the composition.

The layer based on natural rubber to which the adhesion of compositions T1 to T6 (not in accordance with the invention) and of compositions $C_1$ to $C_4$ (in accordance with the invention) was tested corresponds to a composition conventionally used as an inner tyre layer, such as a carcass ply or a tread underlayer. The composition (TO) of this layer based on natural rubber is presented in Table 7 below.

The adhesion of compositions T1 to T6 and $C_1$ to $C_4$ to composition TO was compared. The control compositions T1 and T6 are not in accordance with the invention because the elastomer E1, which comprises more than 50 mol % of ethylene units, does not comprise a 1,3-diene unit of formula (I). Control compositions T1 to T5 are not in accordance with the invention because they do not comprise a plasticizing system in accordance with the invention. Compositions T6, $C_1$, $C_2$, $C_3$ and $C_4$ differ respectively from compositions T1, T2, T3, T4 and T5 solely by the presence of a plasticizing system in accordance with the invention. It may be noted that the silica content has been adjusted in order to keep the volume fraction of filler constant, the volume fraction of filler in a rubber composition being defined as being the ratio of the volume of the filler to the volume of all the constituents of the composition, it being understood that the volume of all the constituents is calculated by adding together the volume of each of the constituents of the composition.

The adhesion measurements were carried out using a T-peel test, also referred to as a 1800 peel test. The peel test specimens are produced by bringing into contact the two layers (the compositions constituting the layers being in the uncured state) for which the adhesion is to be tested. An incipient crack was inserted between the two layers. Each of the layers was reinforced by a composite ply which limits the deformation of said layers under tension. The test specimen, once assembled, was brought to 150° C. under a pressure of 16 bar, for 30 minutes. Strips with a width of 30 mm were then cut out using a cutting machine. The two sides of the incipient crack were subsequently placed in the jaws of an Instron tensile testing machine. The tests were carried out at 20° C. and at a pull speed of 100 mm/min. The tensile stresses were recorded and the latter were standardized by the width of the test specimen. A curve of strength per unit of width (in N/mm) as a function of the movable crosshead displacement of the tensile testing machine (between 0 and 200 mm) was obtained. The adhesion value selected corresponds to the propagation of the crack within the test specimen and thus to the mean stabilized value of the curve. The adhesion values of the examples were also standardized (base 100) relative to the control T1 for compositions T2 to T5 or relative to the control T6 for compositions $C_1$ to $C_4$. An index of greater than 100 indicates a greater improvement in adhesion.

The compositions tested (in phr), as well as the results obtained, are presented in Table 7.

TABLE 7

| Compositions | T0 | T1 | T2 | T3 | T4 | T5 | T6 | C1 | C2 | C3 | C4 |
|---|---|---|---|---|---|---|---|---|---|---|---|
| Natural rubber | 100 | — | — | — | — | — | — | — | — | — | — |
| Elastomer E1 (1) | — | 100 | — | — | — | — | 100 | — | — | — | — |
| Elastomer E2 (1) | — | — | 100 | — | — | — | — | 100 | — | — | — |
| Elastomer E3 (1) | — | — | — | 100 | — | — | — | — | 100 | — | — |
| Elastomer E4 (1) | — | — | — | — | 100 | — | — | — | — | 100 | — |
| Elastomer E5 (1) | — | — | — | — | — | 100 | — | — | — | — | 100 |
| N330 (2) | 35 | — | — | — | — | — | — | — | — | — | — |
| Silica (3) | 10 | 48 | 48 | 48 | 48 | 48 | 80.5 | 80.5 | 80.5 | 80.5 | 80.5 |
| Vol. fraction of filler | unkn. | 16% | 16% | 16% | 16% | 16% | 16% | 16% | 16% | 16% | 16% |
| Coupling agent (4) | 1 | 3.8 | 3.8 | 3.8 | 3.8 | 3.8 | 3.8 | 3.8 | 3.8 | 3.8 | 3.8 |
| Resin (5) | 1 | — | — | — | — | — | — | — | — | — | — |
| Resin (6) | 0.5 | — | — | — | — | — | — | — | — | — | — |
| Resin (7) | — | — | — | — | — | — | 38 | 38 | 38 | 38 | 38 |
| Oil (8) | — | — | — | — | — | — | 38 | 38 | 38 | 38 | 38 |
| DPG (9) | — | 1 | 1 | 1 | 1 | 1 | 1 | 1 | 1 | 1 | 1 |
| Ozone wax (10) | — | 1 | 1 | 1 | 1 | 1 | 1 | 1 | 1 | 1 | 1 |
| Antioxidant(11) | 1 | 2 | 2 | 2 | 2 | 2 | 2 | 2 | 2 | 2 | 2 |
| Stearic acid | 1.5 | 1.5 | 1.5 | 1.5 | 1.5 | 1.5 | 1.5 | 1.5 | 1.5 | 1.5 | 1.5 |
| ZnO (12) | 4.5 | 2.5 | 2.5 | 2.5 | 2.5 | 2.5 | 2.5 | 2.5 | 2.5 | 2.5 | 2.5 |
| Accelerator(13) | 1.5 | 1.3 | 1.3 | 1.3 | 1.3 | 1.3 | 1.3 | 1.3 | 1.3 | 1.3 | 1.3 |
| Sulfur | 1.7 | 0.6 | 0.6 | 0.6 | 0.6 | 0.6 | 0.6 | 0.6 | 0.6 | 0.6 | 0.6 |
| Adhesion (N/mm) | — | 10 | 8 | 4 | 5 | 3 | 14 | 16 | 25 | 25 | 25 |
| Adhesion (base 100/E1) | — | 100 | 80 | 40 | 50 | 30 | 100 | 115 | 180 | 180 | 180 |

(1) Elastomers E1 to E5 prepared according to the process described in point IV-2 above
(2) Carbon black N330 according to Standard ASTM D-1765-2017
(3) Silica, Zeosil 1165MP, sold by Solvay
(4) Triethoxysilylpropyltetrasulfide (TESPT) liquid silane, Si69 from Evonik
(5) Gum rosin (rosin GEM SPE1) from Diamantino Malho
(6) Escorez 1102 tackifying resin from EXXON (Mn 1370 g/mol; PDI = 2.3)
(7) Escorez 5000 series petroleum hydrocarbon resin from Exxon Mobil (Tg = 52° C.)
(8) MES oil, Catenex SNR, sold by Shell
(9) Diphenylguanidine, Perkacit DPG from Flexsys
(10) Anti-ozone wax, Varazon 4959 from Sasol Wax
(11)N-(1,3-Dimethylbutyl)-N-phenyl-para-phenylenediamine Santoflex 6-PPD from Flexsys
(12) Zinc oxide, industrial grade from Umicore
(13)N-Cyclohexyl-2-benzothiazolesulfenamide, Santocure CBS, from Flexsys These results show that the use of a rubber composition in accordance with the invention comprising the combination of a copolymer containing ethylene units and units of a 1,3-diene of formula (I) and of a plasticizing system in accordance with the invention makes it possible to improve the adhesion to a diene composition, compared to a rubber composition comprising a copolymer containing ethylene units and 1,3-diene units different from the 1,3-diene units of formula (I) and/or compared to a composition not comprising the plasticizing system in accordance with the invention. The improvement in adhesion is much greater for the copolymers which are copolymers of ethylene, a 1,3-diene of formula (I) and a second 1,3-diene chosen from 1,3-butadiene, isoprene or a mixture thereof in accordance with the invention.

The invention claimed is:

1. An elastomer laminate comprising at least two adjacent layers, the first layer consisting of a rubber composition based on:

20 to 100 phr of at least one copolymer comprising ethylene units and units of a 1,3-diene of formula (I), the ethylene units in the copolymer representing more than 50 mol % of monomer units of the copolymer, $$CH_2—CR—CH—CH_2 \quad (I),$$

R representing a hydrocarbon chain having 3 to 20 carbon atoms;

0 to 80 phr of at least one diene elastomer having a weight content of diene units of greater than 50%;

35 to 100 phr of a plasticizing system comprising at least one plasticizing resin having a glass transition temperature above 20° C. and/or at least one plasticizer that is liquid at 23° C.;

a reinforcing filler; and a crosslinking system, and the second layer consisting of a rubber composition based on a diene elastomer having a weight content of diene units of greater than 50% and a crosslinking system.

2. The elastomer laminate according to claim 1, wherein the 1,3-diene of formula (I) of the copolymer of the first layer is myrcene, β-farnesene or a mixture of myrcene and β-farnesene.

3. The elastomer laminate according to claim 1, wherein the copolymer further comprises a second 1,3-diene selected from 1,3-butadiene, isoprene or a mixture thereof.

4. The elastomer laminate according to claim 1, wherein the content of the copolymer of ethylene and of a 1,3-diene of formula (I) in the rubber composition of the first layer is within a range extending from 20 to 90 phr, and wherein the diene elastomer having a weight content of diene units of greater than 50% is present in the rubber composition of the first layer at a content within a range extending from 10 to 80 phr.

5. The elastomer laminate according to claim 1, wherein the diene elastomer having a weight content of diene units of greater than 50% of the rubber composition of the first layer is selected from the group consisting of polybutadienes (BRs), natural rubber (NR), synthetic polyisoprenes (IRs), butadiene copolymers, isoprene copolymers and mixtures thereof.

6. The elastomer laminate according to claim 1, wherein the plasticizer that is liquid at 23° C. of the rubber composition of the first layer is selected from the group consisting of liquid diene polymers, polyolefin oils, naphthenic oils, paraffinic oils, Distillate Aromatic Extract (DAE) oils, Medium Extracted Solvate (MES) oils, Treated Distillate Aromatic Extract (TDAE) oils, Residual Aromatic Extract (RAE) oils, Treated Residual Aromatic Extract (TRAE) oils, Safety Residual Aromatic Extract (SRAE) oils, mineral oils, vegetable oils, ether plasticizers, ester plasticizers, phosphate plasticizers, sulfonate plasticizers and mixtures thereof.

7. The elastomer laminate according to claim 1, wherein the content of plasticizer that is liquid at 23° C., in the rubber composition of the first layer, is within a range extending from 1 to 49 phr.

8. The elastomer laminate according to claim 1, wherein the plasticizing resin having a glass transition temperature above 20° C. of the rubber composition of the first layer is selected from the group consisting of cyclopentadiene homopolymer or copolymer resins, dicyclopentadiene homopolymer or copolymer resins, terpene homopolymer or copolymer resins, $C_5$ fraction homopolymer or copolymer resins, C9 fraction homopolymer or copolymer resins, α-methylstyrene homopolymer or copolymer resins and mixtures thereof.

9. The elastomer laminate according to claim 1, wherein the content of plasticizing resin having a glass transition temperature above 20° C., in the rubber composition of the first layer, is within a range extending from 1 to 99 phr.

10. The elastomer laminate according to claim 1, wherein the content of reinforcing filler in the rubber composition of the first layer is within a range extending from 30 to 200 phr.

11. The elastomer laminate according to claim 1, wherein the diene elastomer having a weight content of diene units of greater than 50% of the rubber composition of the second layer is selected from the group consisting of polybutadienes (BRs), natural rubber (NR), synthetic polyisoprenes (IRs), butadiene copolymers, isoprene copolymers and mixtures thereof.

12. The elastomer laminate according to claim 1, wherein the diene elastomer having a weight content of diene units of greater than 50% of the first layer and the diene elastomer having a weight content of diene units of greater than 50% of the second layer are polyisoprenes comprising a weight content of 1,4-cis bonds of at least 90% of the weight of the polyisoprene.

13. The elastomer laminate according to claim 1, wherein the first layer has a thickness within a range extending from 0.2 to 120 mm, and wherein the second layer has a thickness within a range extending from 0.2 to 10 mm.

14. A rubber article comprising the elastomer laminate according to claim 1.

15. The rubber article according to claim 14, wherein the rubber article is selected from the group consisting of pneumatic tires, non-pneumatic tires, caterpillar tracks, conveyor belts and anti-vibratory articles.

* * * * *